United States Patent

Jessop

[19]

[11] Patent Number: 5,950,026
[45] Date of Patent: *Sep. 7, 1999

[54] ROLL STABILIZED, NESTING VEE, MAGNETIC HEAD ASSEMBLY FOR MAGNETICS-ON-FILM

[75] Inventor: Thomas Clifton Jessop, Webster, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/883,558

[22] Filed: Jun. 26, 1997

Related U.S. Application Data

[63] Continuation of application No. 08/625,117, Apr. 1, 1996, abandoned.
[60] Provisional application No. 60/003,639, Sep. 12, 1995, and provisional application No. 60/001,417, Jul. 25, 1995.

[51] Int. Cl.$^6$ .................................................. G03B 17/24
[52] U.S. Cl. ........................................ 396/319; 396/320
[58] Field of Search ................................... 396/310, 312, 396/319, 320; 312/26, 27, 44; 360/3, 130.3

[56] References Cited

U.S. PATENT DOCUMENTS

| 3,029,080 | 4/1962 | Lang ..................................... 360/130.3 |
| 3,040,134 | 6/1962 | Berndt et al. ................................ 360/3 |
| 3,233,958 | 2/1966 | Kaess et al. ............................... 352/27 |
| 3,662,927 | 5/1972 | Borman ..................................... 226/89 |
| 5,016,030 | 5/1991 | Dwyer et al. .............................. 354/21 |
| 5,041,933 | 8/1991 | DeMarti, Jr. et al. ................... 360/104 |
| 5,260,844 | 11/1993 | Koga et al. ............................. 360/96.3 |
| 5,307,100 | 4/1994 | Kubo ...................................... 354/105 |
| 5,309,302 | 5/1994 | Vollmann ............................. 360/130.3 |
| 5,434,633 | 7/1995 | Nagao et al. ........................... 354/106 |

FOREIGN PATENT DOCUMENTS

| 0 446 916 | 9/1991 | European Pat. Off. . |
| 0 555 713 | 2/1992 | European Pat. Off. . |
| 1 449 321 | 1/1969 | Germany . |

*Primary Examiner*—Eddie C. Lee
*Attorney, Agent, or Firm*—Frank Pincelli

[57] ABSTRACT

An apparatus for reading and/or writing information on the magnetic surface of a photographic filmstrip. The apparatus includes a mounting member and a fixed support roller over which a filmstrip is passed. The roller has an axis of rotation. At least one magnetic head is mounted to the mounting member in a manner such that the head comes in contact with the filmstrip over the area which the film is in contact with the fixed support roller at a first point along the circumference of said support roller. The mounting member has a contact surface for coming in contact with the filmstrip at a second area in which the filmstrip is in contact with the support roller which is located at a second point spaced circumferentially from the first point. A spring is provided for applying a force against the mounting member so as to cause the at least one magnetic head and the at least one contact surface to be pressed against said film and support roller simultaneously such that the mounting member will be nested against the support roller.

10 Claims, 4 Drawing Sheets ns a set of edge strip
ROLL STABILIZED, NESTING VEE, MAGNETIC HEAD ASSEMBLY FOR MAGNETICS-ON-FILM This is a continuation of U.S. application Ser. No. 08/625,117, filed Apr. 1, 1996 now abandoned.

CROSS REFERENCE TO RELATED APPLICATION

Reference is made to and priority claimed from U.S. Provisional Application Serial No. 60/003,639, filed Sep. 12, 1995, entitled ROLL STABILIZED, NESTING VEE, MAGNETIC HEAD ASSEMBLY FOR MAGNETICS-ON-FILM.

Reference is made to the following commonly assigned, copending applications: U.S. Ser. No. 08/171,582, filed Dec. 22, 1993 for FILM PROCESSING SYSTEM, in the names of Francis C. Long, Walter C. Slater, Thomas J. Murray, Bradley C. DeCook, Howard C. Bozenhard, now U.S. Pat. No. 5,473,402; and U.S. Ser. No. 60/001,417, filed Jul. 25, 1995 for ROLL STABILIZED, NESTING VEE, MAGNETIC HEAD ASSEMBLY FOR MAGNETICS ON FILM by Thomas C. Jessop and Douglass L. Blanding.

FIELD OF THE INVENTION

This invention relates to a magnetic record and/or reproduce head assembly for achieving high magnetic head compliance with the magnetics-on-film (MOF) layer of relatively stiff photographic filmstrips, particularly during photofinishing operations.

BACKGROUND OF THE INVENTION

In commonly assigned U.S. Pat. Nos. 4,933,780 and 5,016,030, a photographic filmstrip having a virtually transparent, magnetic film layer on the non-emulsion side of the filmstrip (referred to as an MOF layer) is disclosed in conjunction with various camera systems. One or more longitudinal read/write tracks are illustrated in the MOF layer between the side edges of the image frame area and the filmstrip where information such as film type, film speed, film exposure information, and information relevant to the processing and subsequent use, e.g., printing, of the exposed image frames is pre-recorded during manufacture of the filmstrip cartridge. The cameras disclosed therein provide for reading out the pre-recorded information useful for controlling camera operations and recording of information on certain other tracks during camera use. The information recorded during camera use may include voiced messages or sound associated with the photographed scene and may be recorded in digital or analog format on the certain tracks. It is contemplated that both the pre-recorded and the camera use recorded information will be read out for control and reprint purposes during photofinishing. Also, it is desirable for the photofinisher to have the capability to record additional information related to finishing, e.g., printing exposure conditions, customer information, reorder information, etc., in further tracks.

A photographic filmstrip is described in detail in commonly assigned U.S. Pat. No. 5,229,810, for example, incorporated herein by reference, having an optically transparent MOF layer continuously coated on the non-emulsion side of the filmstrip base. Turning first to FIGS. 1A and 1B, they schematically depict such a filmstrip 100 of the type described in the '810 patent having a base 110 with photographic emulsion layers 115 on one side and a virtually transparent MOF layer 120 on the non-emulsion side. An anti-static and lubricating layer 122 covers the MOF layer 120, and perforations 125 are provided for metering image frame areas through a camera exposure gate. Each image frame area of the filmstrip 100 includes a set of edge strip regions of the MOF layer 120, e.g., regions 100a and 100b, including record/reproduce track pairs C0, C1 and C2, C3 adjacent to respective filmstrip edges 102 and 104. A central image frame region of the MOF layer 120 includes tracks F00–F29 extending the image frame length 100a. The filmstrip 100 has a predetermined nominal width 108 for the filmstrip type, and tracks C0–C3 and F00–F29 have defined widths.

As described in the '810 patent in detail, the edge tracks C0–C3 are intended to be used for recording exposure related information in a camera having edge mounted magnetic recording heads. Certain of the tracks F00–F29 are intended to contain filmstrip type information pre-recorded by the filmstrip manufacturer, and other of the tracks F00–F29 are reserved for recording information during photofinishing.

In a variation of the filmstrip 100, recording and reproducing in the tracks F00–F29 is not practiced, and the MOF layer 120 may or may not be coated over the image frame area. In this variation, one or more of the tracks C0–C3 in the edge regions 100a and 100b are used for recording print related information, e.g., the color correction and exposure data applied in the most recent set of prints made from the image frames. In such photofinishing equipment as described in the above-referenced U.S. Ser. No. 08/171,582 application, certain of the tracks are read out prior to printing to control printing operations, and the print related information is recorded in the recording tracks contemporaneously with making the print exposure.

The photographic filmstrip 100 is of much greater thickness than the magnetic tape used for commercial and consumer recording and reproduction and is neither compliant nor inherently flat. When removed from its cartridge, such a filmstrip shows a relatively high stiffness and very observable cross-curvature across its width that is convex on or toward the emulsion side of the filmstrip. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-film curvature or curl across the width of the filmstrip is primarily caused by the number of multilayers of emulsion and MOF layer. The emulsion and MOF multilayers have different stretch properties than that of the base film substrate of acetate, PET, or PEN material. The cross-film curl is also influenced by the bending phenomena known as anticlastic curvature. The degree of cross-film curl also depends on environmental conditions, including the time and temperature history of the film, the relative humidity, and the thickness of the film.

Because of the cross-film curl, it is difficult to achieve good contact or compliance across the width of a magnetic read/write head. To provide a reliable read or write signal, the length of the magnetic recording head gap must remain in close proximity to the magnetic coating. Any disturbances, such as variations in cross film curl, can vary the relationship of the recording head gap to the magnetic coating and decrease the reliability of the signal.

Therefore, it is necessary to the extent possible to flatten out the transverse or cross film curl particularly at the side edge regions 100a, 100b where the MOF recording tracks C0–C3 are situated, to provide the flat plane during read out of tracks C0–C3 and to track the filmstrip edges 102, 104 as closely as possible.

Commonly assigned U.S. Pat. Nos. 5,034,836, 5,041,933, 5,274,522, 5,285,324 and 5,285,325 and further U.S. Pat. No. 5,307,100 disclose magnetic recording head configurations for use in recording and/or reproducing in longitudinal tracks alongside the filmstrip edges, but not in the image frame area. These patents showing magnetic recording heads for recording along the edges of the filmstrip outside the image area generally teach shaping the magnetic record/reproduce heads as arc sections of a cylinder and either flattening the filmstrip or wrapping or conforming the filmstrip MOF layer over the arc section to provide a line contact of the magnetic head gap with the MOF layer. Pressure pad supports or rollers on the emulsion side opposite from the recording heads and continuous motion of the filmstrip are taught to provide compliance for recording and/or reproducing information.

These arrangements cause the filmstrip to be wrapped or straightened against its inherent cross-film and longitudinal curl. This can cause the edge strip regions 100a and 100b to be inclined to curl away from the magnetic head gaps in the head gap length direction extending toward the side edges 102,104.

In a photographic filmstrip bearing a MOF layer as described above, the density of the virtually transparent MOF layer is much lower than in magnetic tape. Because of the low magnetic density of the MOF layer and the susceptibility of the emulsion side to scratching and damage, it is of particular importance that the magnetic read/write head-to-film interface must have high compliance.

Problems to be Solved by the Invention

The invention is directed to solving the above stated problems of recording and reproducing information on MOF layers of a filmstrip, particularly in filmstrip processing, handling or other apparatus, while avoiding damage to the filmstrip.

SUMMARY OF THE INVENTION

It is, therefore, a primary object of the invention to enhance the compliance of a magnetic read/write head with the MOF layer of a filmstrip for recording and/or reproducing information accurately in one or more parallel tracks in the MOF layer of a photographic filmstrip.

It is a further object of the invention to provide a simplified edge tracking and head alignment system for magnetic read/write heads for MOF layer recording and reproducing as well as in other magnetic webs.

In accordance with the present invention, there is provided an apparatus for reading and/or writing information on the magnetic surface of a photographic filmstrip. The apparatus includes a mounting member and a fixed support roller over which a filmstrip is passed. The roller has an axis of rotation. At least one magnetic head is mounted to the mounting member in such manner such that the head comes in contact with the filmstrip over the area which the film is in contact with the fixed support roller at a first point along the circumference of said support roller. The mounting member has a contact surface for coming in contact with the filmstrip at a second area in which the filmstrip is in contact with the support roller which is located at a second point spaced circumferentially from the first point. A spring is provided for applying a force against the mounting member so as to cause the at least one magnetic head and the at least one contact surface to be pressed against said film and support roller simultaneously such that the mounting member will be nested against the support roller.

Advantages of the Invention

The wrapping of the filmstrip about a support roller flattens out cross film curl and allows a magnetic record/reproduce head to effectively apply pressure against the MOF layer to ensure flatness, particularly along the edge strip regions of the filmstrip that are susceptible to curl. The nesting arrangement of the head in the magnetic head assembly with respect to the support roller enables compliance and alignment of the magnetic read/write head gap with the edge strip regions of the filmstrip MOF layer and the flattening of any residual edge curl.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1A:
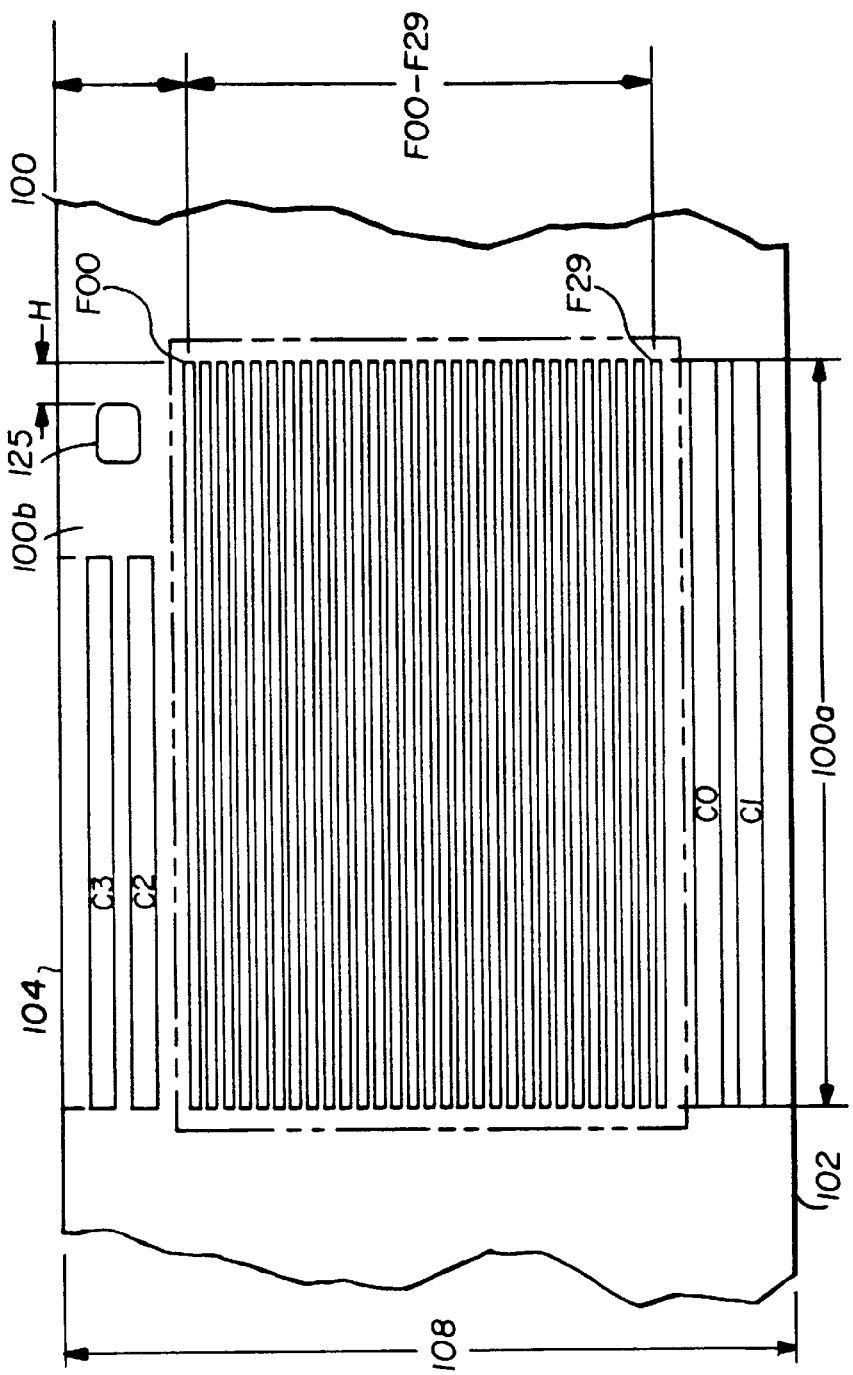
FIG. 1A is a plan view of a prior art photographic filmstrip with a MOF layer and dedicated recording tracks which can be employed in the practice of the invention.
Figure 1B:
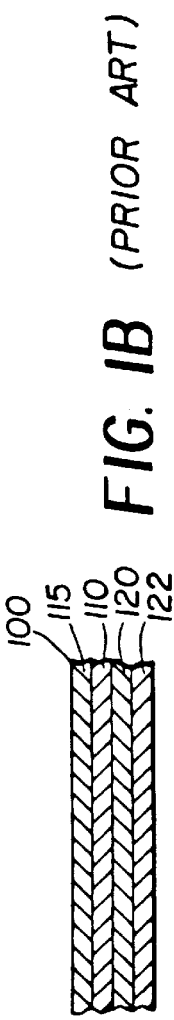
FIG. 1B is a side cross-sectional view of the prior art filmstrip of FIG. 1A.

Preferably, the present invention is practiced with a filmstrip having an MOF layer coated as described above with respect to FIG. 1, and particularly for recording and reproducing only in all (or less than all) of the edge tracks C0–C3. In the embodiment illustrated the magnetic layer is substantially transparent so as not to substantially affect the optical properties of the filmstrip and has a thickness in the range of about 0.9 to 1.6 microns. The magnetic head assembly and support roller of the present invention may be employed in the processing system of the above-referenced U.S. Ser. No. 08/171,582 application, now U.S. Pat. No. 5,473,402, or other photofinishing equipment to read out data recorded in MOF layer edge strip region tracks of such filmstrips to employ in controlling image reproduction operations or in other contexts. In addition, such equipment may be used to record information in certain of the tracks.

As described above, the typical prior art practice in this field has been to shape the magnetic record/reproduce heads as arc sections of a cylinder and to wrap or conform the filmstrip MOF layer over the arc section or to straighten the filmstrip as much as possible. This bending of the filmstrip 100 is against its normal, unstressed tendency to curl and is not always effective.

Figure 2A:
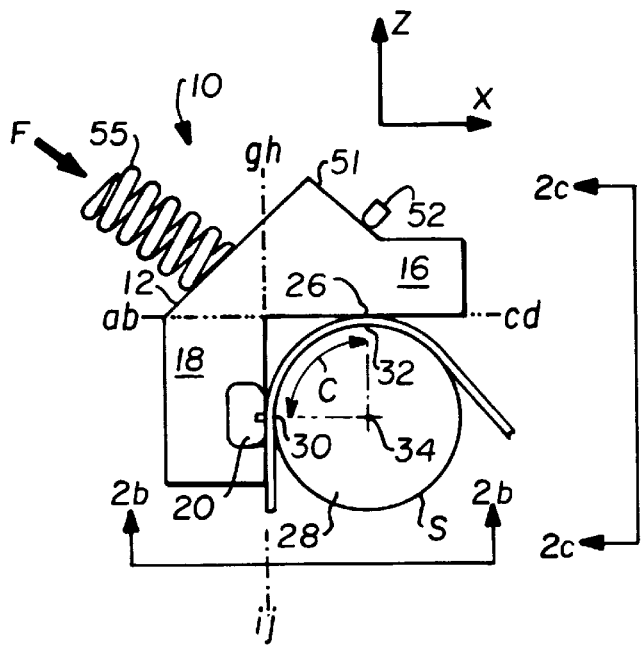
FIG. 2A is a schematic view illustrating the principles of the invention.
Figure 2B:
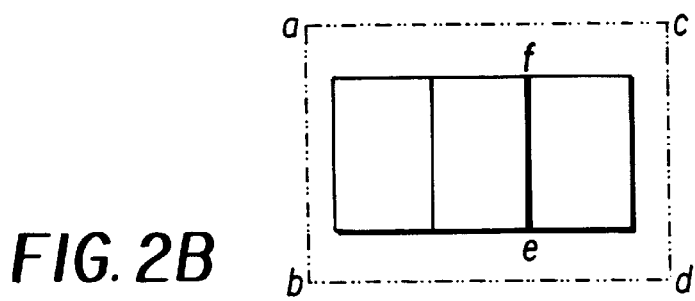
FIG. 2B is a plan elevational view of FIG. 2A as taken along line 2b—2b with the support roller removed.
Figure 2C:
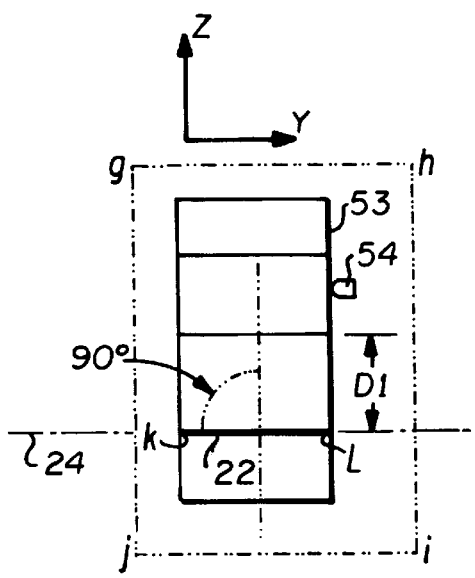
FIG. 2C is a side elevational view of FIG. 2A as taken along line 2c—2c with the support roller removed.

Turning to FIGS. 2A, 2B, and 2C, the nesting VEE principle of the alignment of a magnetic head assembly employed in the present invention is schematically illustrated. In FIG. 2A, the head assembly 10 comprises a support member 12. In the particular embodiment illustrated, the support member 12 has a generally V-shaped configuration, having a pair of leg sections 16,18. In the embodiment illustrated, a magnetic head 20 is provided for reading and/or writing magnetic information onto a magnetic layer. As is typical with magnetic heads, there is provided a magnetic gap 22 which extends along a longitudinal axis 24. The leg section 16 is provided with a contact section 26. The magnetic gap 22 and contact section 26 are designed to contact a cylindrical support roller 28 at points 30,32, spaced an angular distance C about the circumference of the roller 28. The angular distance C is generally in the range of 30° to 180°, preferably from about 30° to 165°. The cylindrical support roller 28 has a axis 34 about which the roller 28 rotates. In FIG. 2B, an imaginary plane ABCD, which contains contact section 26, is brought into line contact EF with cylindrical surface S of roller 28. In FIG. 2C, an imaginary plane GHIJ, which contains gap 22, is brought into line contact KL with cylindrical surface S of roller 28. As illustrated in FIG. 2A, a force F is applied to support member 12 such that the contact section 26 and magnetic gap 22 are placed in contact with the surface S of roller 28. The distance D1 between the gap 22 and the plane ABCD is selected so that member 12 is designed to be used with a specific diameter cylindrical roller. The distance D1 is also selected to take into account the thickness of the film wrapped about the support roller 28. The plane ABCD locates the gap 22 in the Z axis direction and also in the rotational direction about the X axis. Thus, the gap 22 will lie along the contact line with the roller 28 of the second plane GHIJ (see FIG. 2B). The present invention permits the mounting member to move in at least two directions so as to conform to the surface of the roller, one of the directions being parallel to the axis of said fixed support roller. Due to the generally V-shaped construction of the support member 12, the support member 12 will tend to nest at a particular orientation with respect to the cylindrical roller 28. The magnetic head 20 is mounted to member 12 such that the axis 24 of the magnetic gap 22 will be substantially parallel to axis 34.

In order to constrain the head assembly from rotating about the Y axis and moving in the Y direction, stops 52,54 secured to the frame (not shown) are provided for engaging the contact surfaces 51,53 of the support member 12, respectively.

Figure 3A:
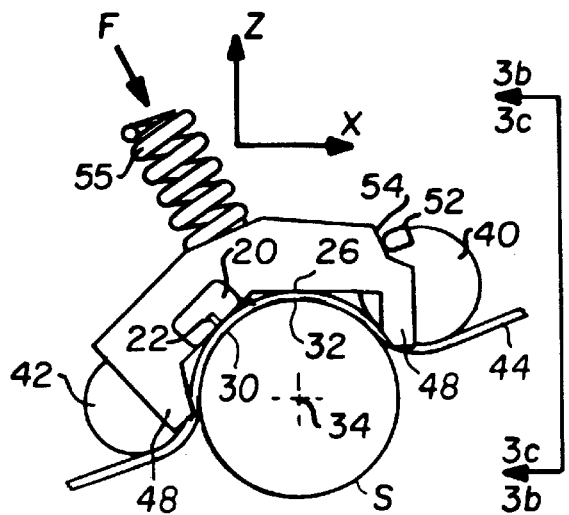
FIG. 3A is a schematic view of an alternative embodiment of the invention also illustrating the principles of the invention.
Figure 3B:
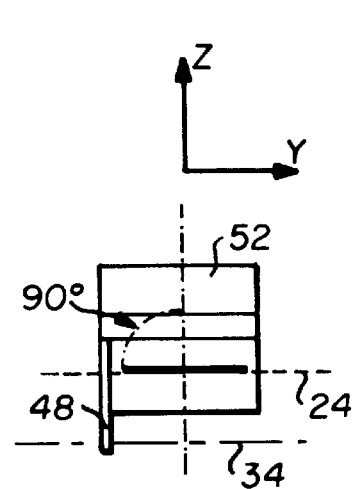
FIG. 3B is a side elevational view of FIG. 3A as taken along line 3b—3b with the support roller, wrap rollers, and filmstrip removed.
Figure 3C:
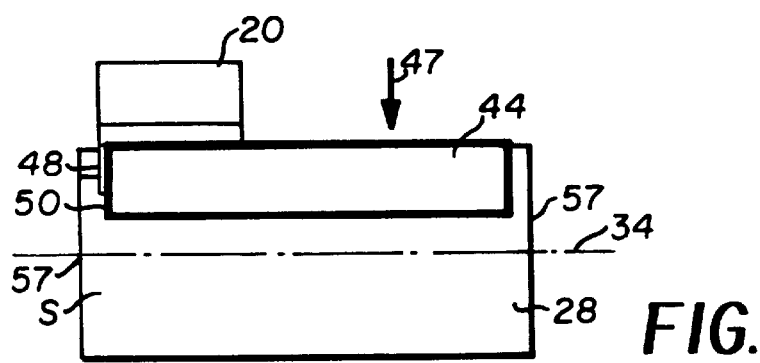
FIG. 3C is a side elevational view of FIG. 3A as taken along line 3c—3c with the wrap rollers removed.

Referring to FIGS. 3A, 3B, and 3C, there is illustrated a magnetic head assembly 10 similar to that illustrated in FIGS. 2A–2C, like numerals indicating like parts, except that the support member 12 has a slightly different configuration. Additionally, a pair of wrap rollers 40,42 are provided for wrapping a strip of photographic film 44 firmly about the outer cylindrical surface S of roller 28. As can be seen, the support member 12 engages the support roller 28 at points wherein the photographic film 44 is tightly wrapped about the surfaces. A retaining force F is applied against support member 12 so that the magnetic gap 22 and contact support section 26 are in direct immediate contact with the surface of the film 44. As illustrated by FIG. 3B, axis 24 of gap 22 is substantially parallel to the rotational axis 34 of roller 28. Referring to FIG. 3C, there is illustrated a view similar to FIG. 3B, with the roller 28 present and the film 44 wrapped about the support roller 28. The film 44 moves along its longitudinal axis 46, as indicated by arrow 47, which is substantially perpendicular to the axis 34 of the roller. Accordingly, the axis 24 of gap 22 would then be positioned substantially perpendicular to the tracks C0–C3 and thus optimally aligned for best reading/recording. The support member 12, in this embodiment, is provided with a pair of edge guides 48 which are used to register against the edge 50 of the filmstrip 44 so that the magnetic head 20 is properly located with regard to the track(s) to be read.

Figure 3D:
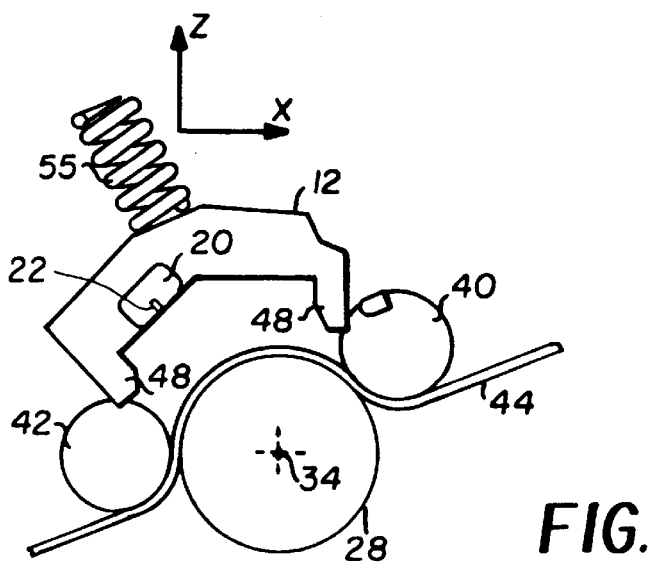
FIG. 3D is a view similar to FIG. 3A illustrating the magnetic head in the disengaged position.

As also illustrated by FIGS. 3A and 3B, means are provided for preventing movement of the support member 12 in undesirable directions. For example, as illustrated by FIG. 3A, a stop 52 is provided on the photofinishing device for engagement with stop surface 54 provided on member 12. Stop 52 is secured to the frame of the device and prevents rotation of member 12 about the Y axis. As illustrated by FIG. 3C, edge guides 48 limit the movement of the support member 12 in the Y direction. The guides 48 are biased against the edge 50 of the filmstrip 44 by a spring (not shown) thus allowing the member 12 to be self aligning with respect to the edge 50 of the filmstrip 44. An appropriate mechanism (not shown) may be provided for engaging and disengaging support member 12 with the support roller 12 thereby allowing filmstrip 44 to be threaded about support roller 34 and wrap rollers 40,42. FIG. 3D illustrates the support roller in the unengaged position, whereas FIG. 3A illustrates the support member 12 in the engaged position for reading and/or writing of the information onto the magnetic layer.

The present invention provides a head assembly wherein the support member 12 conforms to the surface of the roller 28, while at the same time, aligning the head gap 22 in the appropriate direction with respect to the track on the filmstrip 44, thus allowing the head assembly to be retracted in and out of engagement with the support roller numerous times, yet allowing quick and easy positioning of the head assembly with the magnetic layer with the same alignment.

As shown in FIGS. 2A–C and 3A–D, the support head causes the magnetic read/write head 14 to bear against the edge strip regions of the filmstrip 44, opposite to the support roller 12 and within an angle of wrap within the filmstrip 44. The magnetic read/write head is supported in the VEE-block so that the head gap 22 makes a tangential line contact parallel to the axis of the cylindrical support roller 28 such that the axis of the magnetic gap 22 would be substantially perpendicular to the direction of travel of the filmstrip 44 and thus be in a proper orientation with respect to the magnetic tracks.

In accordance with the preferred embodiment of the present invention, a magnetic head assembly 10 includes means for moving the head assembly 10 in and out of engagement with the support roller 28. When the magnetic head assembly 10 is in engagement with the cylindrical support roller, a spring 55, for example, a coil spring as illustrated in FIG. 3A, provides a biasing force against the support member 12 which causes the contact section 26 and gap 22 to be in intimate contact with the filmstrip 44. In combination with the edge guides 48 and stop 52, the assembly 10 requires no other relative movement of the magnetic head with respect to the filmstrip 44. In this fashion, the magnetic head is spaced to follow the desired tracks of the filmstrip 44. Moreover, the line contact of the head gap of magnetic read/write head 20 is aligned to fall in line substantially parallel to the axis of the roller 28.

The support roller 28 is mounted at its axial ends 57 for rotation by bearings (not shown) to transport frame (also not shown) so that roller 28 rotates freely about axis 34. Wrap rollers 40,42 are also supported on a roller bearing and axial assembly (not shown) mounted to the frame (not shown). The axis of rotation of the support roller 28 and the wrap rollers 40,42 are therefore fixed in parallel with respect to one another during filmstrip transport. The serpentine transport path extends between the wrap rollers 40,42 and the support roller 28. A filmstrip advance mechanism (not shown) is spaced apart from the position of the support roller 28, wrap rollers 40,42, and the magnetic head assembly 10 along the film transport path. Operation of the filmstrip advance mechanism imparts motion to the filmstrip 100 to advance it from a supply reel (not shown) to a take-up reel (also not shown), which in turn causes the support roller 12 and the wrap rollers 40,42 to roll freely.

Although the preferred embodiment described above discloses the relative Z-direction movement of the head assembly to affect the advancement and retraction of the positions, it will be understood that the frame suspending the support roller 28 and the wrap rollers 40,42 could alternatively be made moveable in the Z-direction.

The lift mechanism for moving the head assembly can be modified to be motor or solenoid operated or remain manually operable, depending on the intended use.

Figure 4:
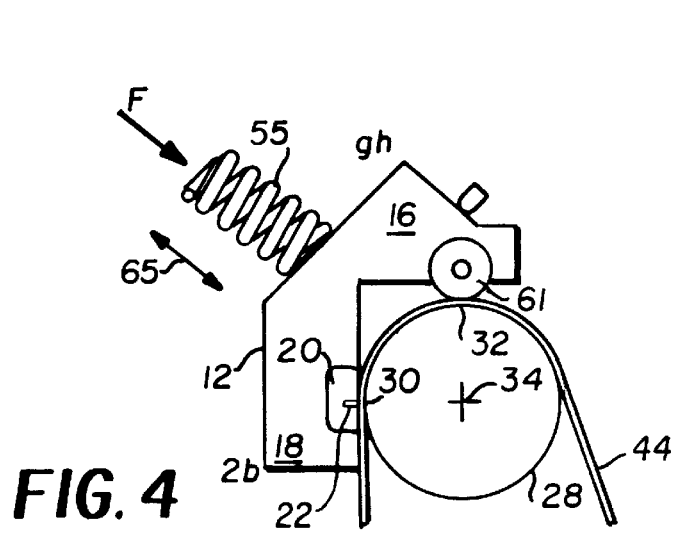
FIG. 4 is a schematic view of a modified magnetic head assembly made in accordance with the present invention.

Referring the FIG. 4, there is illustrated a modified form of the present invention, like numerals indicating like parts and operation. In this embodiment, member 12 has a rotatable roller 61 for contacting the filmstrip 44 and applying a force against roller 28. In this embodiment, the direction of engagement and disengagement of the head assembly is illustrated by arrow 65. This avoids any potential sliding action that may occur between the film and contact section 26.

Figure 5:
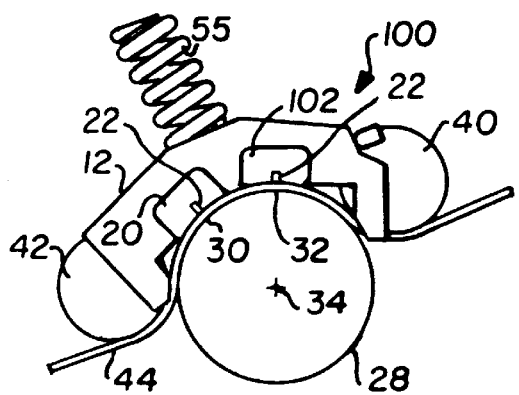
FIG. 5 is a schematic view of yet another modified magnetic head assembly made in accordance with the present invention.

Referring to FIG. 5, there is illustrated a schematic view of yet another embodiment of a head assembly 100 made in accordance with the present invention. Head assembly 100 is similar to head assembly 10 illustrated in FIGS. 3A–3C, like numerals indicating likes parts and operation. In this embodiment a second magnetic head 102 is located at the contact section 26 such that the gap 22 of head 102 is also parallel to the axis 34 of the support roller 28.

The above-described system can be utilized in a variety of magnetic head assemblies. An example of an alternate head assembly which the concepts of the instant invention may be employed is disclosed in U.S. application Ser. No. 60/001,417; filed Jul. 25, 1995 for ROLL STABILIZED, NESTING VEE, MAGNETIC HEAD ASSEMBLY FOR MAGNETICS ON FILM by Thomas C. Jessop and Douglass L. Blanding, which has been previously incorporated in its entirety by reference.

The subject invention provides a magnetic head assembly for reading and/or recording onto a thin magnetic layer provided on a photographic film which is reliable and provides the required contact between the magnetic head and magnetic layer.

It is to be understood that various other changes and modifications may be made without departing from the scope of the present invention. The present invention being set forth by the claims set forth hereafter.

PARTS LIST 10 magnetic head assembly
12 support member
16,18 leg sections
20 magnetic head
22 magnetic gap
24 longitudinal axis
26 contact section
28 support roller
30,32 points
34 axis
40,42 wrap rollers
44 photographic film
46 longitudinal axis
47 arrow
48 edge guides
50 edge
51,53 contact surfaces
52,54 stops
55 spring
57 ends
61 rotatable roller
65 arrow
100 head assembly
102 second magnetic head

I claim:

1. An apparatus for reading and/or writing information on a thin magnetic layer on a photographic filmstrip, comprising:

a fixed support roller over which a filmstrip is passed, said roller having an axis of rotation;

a single unitary mounting member;

at least one magnetic head mounted to said mounting member in such a manner that the head contacts the filmstrip over the area in which said filmstrip is in contact with said fixed support roller, said at least one magnetic head being positioned at a first point along a circumference of said support roller;

said mounting member having a contact surface which contacts said filmstrip in the area in which said filmstrip is in contact with said support roller, said contact surface being located at a second point spaced circumferentially from said first point about said mounting member; and a spring member, said mounting member being secured to said spring member such that said spring member applies a force against said mounting member so as to cause said at least one magnetic head and said at least one contact surface to be pressed against said filmstrip and support roller simultaneously permitting the mounting member to move in at least two directions so as to conform to the surface of the roller such that the mounting member will be nested against said support roller and said magnetic head will form a tangential line contact with the roller which is parallel to the axis of the roller, one of said at least two directions being parallel to the axis of said fixed support roller.

2. An apparatus according to claim 1 wherein said magnetic head comprises a magnetic gap having a longitudinal axis, said magnetic head is positioned such that the longitudinal axis is parallel to the axis of rotation of said support roller.

3. An apparatus according to claim 1 wherein said at least one magnetic head comprises a read head and a write head.

4. An apparatus according to claim 1 wherein said contact surface comprises a roller mounted to said mounting member.

5. An apparatus according to claim 4 further comprising means for wrapping the filmstrip about said support roller.

6. An apparatus according to claim 1 further comprising means for wrapping said filmstrip about said support roller.

7. An apparatus according to claim 1 wherein said film has a transparent magnetic layer having a thickness in the range of about 0.9 to 1.6 microns.

8. An apparatus according to claim 1 wherein said mounting member has a second magnetic head having a gap such that the gap of said second magnetic head is located at said second point.

9. An apparatus according to claim 1 wherein said mounting member has a pair of legs, said magnetic head mounted in one leg and the contact surface being in the other leg so as to form a V-shaped nest.

10. An apparatus according to claim 1 wherein said first and second points are spaced a circumferential angular distance apart in the range of 30° to 180°.

* * * * *